United States Patent [19]

Rion

[11] 3,936,406

[45] Feb. 3, 1976

[54] STABLE EMULSIONS
[75] Inventor: Pat F. Rion, Borger, Tex.
[73] Assignee: Phillips Petroleum Company, Bartlesville, Okla.
[22] Filed: Mar. 11, 1974
[21] Appl. No.: 449,641

[52] U.S. Cl. ..... 260/29.7 GP; 106/279; 106/281 R; 260/29.7 E; 260/29.7 EM; 260/33.6 AQ
[51] Int. Cl.². C08L 7/02; C08L 11/02; C08L 15/02
[58] Field of Search...... 260/29.7 G, 29.7 P, 29.7 E, 260/29.7 EM, 33.6 AQ; 106/281, 279

[56] References Cited
UNITED STATES PATENTS

| 3,404,108 | 10/1968 | Regenstein et al. | 260/29.7 E |
|---|---|---|---|
| 3,577,250 | 5/1971 | Rostler | 260/4 |
| 3,805,447 | 4/1974 | Rion | 260/33.6 AQ X |

OTHER PUBLICATIONS

Weinstock et al., *Physical Props. of Oil Enriched Rubbers* in Ind. Eng. Chem. 45, No. 5, May '53, pp. 1035–1043.

Blackley, *High Polymer Latices* I, pp. 20–21, 28, (applied Science, 1966).

*Primary Examiner*—Murray Tillman
*Assistant Examiner*—T. DeBenedictis, Jr.

[57] ABSTRACT

Control of the pH of an elastomer-containing emulsion concentrate having an external water phase and an oil phase containing a dissolved elastomer, the oil preferably being an aromatic oil having an aromatic content of at least 50 percent and a viscosity below about 50 SUS at 210° F., within the range of a pH of 1 to 3.5, results in an emulsion concentrate system having improved storage stability. Such an emulsion concentrate system can be let down with water to form a frictionally stable emulsion system useful in the treating of asphalt pavements.

6 Claims, No Drawings

STABLE EMULSIONS

The general concept of adding rubber to asphalt for the purpose of producing an improved binder for use in highway construction is well known, and the art demonstrates the many approaches made toward achieving this addition. In general, nearly all of the prior art pertaining to the incorporation of rubber into asphalt requires adding the rubber to hot asphalt prior to its use in road construction.

More recently, it has been proposed to incorporate elastomer into asphalt by use of an emulsion system comprising a water phase and an elastomer-containing oil phase, which is applied directly to the asphalt pavement. However, a problem with this approach to the incorporation of elatomers into asphalt is that poor frictional stability of the emulsion system causes premature breaking of the emulsion prior to its contact with the asphalt pavement.

To overcome the problem of frictional instability, it has recently been proposed that the formulation of the emulsion concentrate system be such that there is a water phase and an oil phase containing dissolved elastomer therein using an aromatic oil having an aromatic content above 50 percent and a viscosity below about 50 SUS at 210° F. Such a combination has been found to produce a frictionally stable emulsion system which can be readily applied to asphalt pavement.

However, it has now developed that, in addition to the problem of frictional instability, there is a problem with storage stability of emulsion concentrate systems comprising a water phase and an elastomer-containing oil phase.

Accordingly, it is an object of this invention to provide an emulsion system which is both frictionally stable and storage-stable.

Another object of the invention is to provide a storage-stable emulsion concentrate system.

Other aspects, objects and the several advantages of the invention will be apparent to those skilled in the art from the following disclosure.

In accordance with the present invention, it has been discovered that storage stability of an emulsion concentrate system having an external water phase and an oil phase containing a dissolved elastomer, the oil being an aromatic oil having an aromatic content of at least 50 percent and a viscosity below about 50 SUS at 210° F., can be controlled by controlling the pH of the emulsion concentrate system.

More specifically, it has now been discovered that by reduction of the pH of an emulsion concentrate system having a water phase and an oil phase having dissolved elastomer therein, as described above, to a pH in the range of 1 to 3.5, a substantial improvement is produced in the storage stability of the emulsion concentrate system.

By storage stability is meant the ability of the emulsion or emulsion concentrate to remain stable during storage in order to avoid premature breaking of the emulsion prior to its use.

In accordance with the overall concept of this invention, a solution of an elastomer is formed in a suitable aromatic oil. The resulting solution is then emulsified in water to form a concentrate having a pH of 1 to 3.5. The preferred emulsification system is one resulting in a cationic emulsion.

The aromatic oil in the preferred embodiment is substantially free of asphaltenes, i.e., has a maximum asphaltenes content of not more than about 1 percent, and has a viscosity below about 50 SUS at 210° F. Preferably, the oil should be soluble in n-pentane, according to the method described in ASTM designation D2006-65T. The elastomer should be soluble in the oil, and the oil should be compatible with the asphalt and the elastomer.

In one presently preferred embodiment of the invention, an $SO_2$ extract oil is employed as the aromatic oil, having the following properties:

| | |
|---|---|
| Specific gravity | 0.991 |
| API gravity | 10–11 |
| Flash point | 230° F. |
| Pour point | 40° F. |
| Viscosity, Saybolt Universal Seconds at 210° F. | 40 |
| Paraffinic hydrocarbons | 0 |
| Carbon residue | 1.75% |
| Sulfur, weight percent | 1.4 to 2 |
| Bromine number | 28.5 |
| Olefins, volume percent | .48 |
| Aromatics, weight percent | 74 |
| Initial boiling point on distillation | 500° F. |
| 50% boiling point on dist. | 670° F. |
| 80% boiling point on dist. | 744° F. |

Such as oil is produced by liquid-liquid extraction of a cycle oil recovered from the products of a catalytic cracking process. Sulfur dioxide is used as the selective solvent in the extractor, the sulfur dioxide selectively dissolving the aromatics from the feed oil and rejecting the non-aromatic portion. The aromatic product is recovered from the sulfur dioxide extract by distillation. The aromatic oil may be used directly as the oil phase in the preparation of the inventive emulsion, or it may be additionally vacuum fractionated for removal of light and/or heavy ends. A preferred oil with the properties given in the above table was vacuum distilled at 5 mm Hg pressure and 70 percent of the feed taken overhead as the product oil. The oil may be additionally purified by a lime-treating step for removal of traces of sulfur dioxide. For further details of the sulfur dioxide extraction process for the preparation of an aromatic oil suitable for the emulsions of this invention, see U.S. Pat. No. 3,007,979 to Peters.

Similar oils with high aromatic contents and low viscosities may be prepared by solvent extraction of cycle oils using other selective solvents, for example, phenol, sulfolane, diethylene glycol, etc. If desired, mixtures of these oils or mixtures thereof with other oils can be employed so long as the ultimate blend possess the required aromatic and SUS values as above defined.

By the present invention there is provided an oil-water emulsion concentrate having an oil phase and a water phase and wherein said water phase constitutes from about 25 to 60 weight percent of the total emulsion and said oil phase constitutes from about 75 to 40 weight percent of said emulsion, wherein said oil phase contains from 2 to 40 weight percent elastomer dissolved therein and wherein said oil phase is formed of an aromatic oil having an aromatic content of at least 50 percent and a viscosity below about 50 SUS at 210° F., and wherein the total emulsion concentrate system has a pH in the range of 1 to 3.5.

Such emulsion concentrates are of particular importance since they permit the transporting of stable higher elastomer content emulsions at reduced freight rates. Such storage-stable systems can thereafter be readily diluted on location to give the desired rubber content for the treatment of the asphalt pavement.

The emulsion systems of this invention are prepared by first forming a solution of the elastomer in the aromatic oil. The quantity of elastomer present in the oil can be varied depending on the amount of elastomer to be combined with the asphalt within the treated asphalt pavement. The resulting solution of elastomer in aromatic oil is then emulsified with water to form an emulsion concentrate as above described wherein the elastomer is in an amount of about 2 to 40 percent by weight of the oil phase and the oil phase (oil plus elastomer) represents from about 40 to 75 weight percent of the total emulsion concentrate. The resulting concentrate can be applied to asphalt pavement or it can be further diluted with water prior to its application to the pavement.

The quantity of water employed in the dilution of the emulsion concentrate can be varied within the scope of this invention and depends upon the treatment to be given to a particular asphalt pavement. Generally, diluted emulsion systems which contain 90 to 50 percent by weight of water, from 10 to 50 percent by weight of the oil-rubber phase and from 2 to 15 percent by weight elastomer are employed for the asphalt treatment.

Typical of emulsification equipment which may be used in forming the emulsion are colloid mills, high-speed emulsifiers, ultrasonic emulsifiers, homogenizers, pipeline mixers, and the like. Any emulsification equipment can be used which produces a fine particle-size emulsion of high stability, i.e., an emulsion which will not break on contact with the road surface and which will penetrate into the pavement to the depth desired.

In producing the emulsion concentrate systems of this invention with the desired pH range of 1 to 3.5, the pH control is achieved either by direct addition of a sufficient amount of acid (hydrogen ions) to the system to produce the specified pH or else the ratio of ingredients of the emulsion system is so adjusted that sufficient excess acid is present within the system to impart to the resulting emulsion concentrate a pH within the specified range of 1 to 3.5 Such an adjustment is shown in Example I (recipe No. 2) set forth below, where a pH adjustment is achieved by reduction of the basic emulsifier (Redicote E-1) in the water phase of the emulsion system to make the water phase more acid.

The term "elastomer" as used herein is intended to include any type of rubber, natural or synthetic, which is soluble in the aromatic oils above described. Such elastomers are, for example, natural rubber, butadiene-styrene copolymers formed by either emulsion or solution processes, such as SBR 1500 (ASTM D-1419-62T), SBR block copolymers, cis-polyisoprene and trans-polyisoprene. In one presently preferred embodiment of the invention the elastomer is a solution-polymerized butadiene-styrene block copolymer having an average molecular weight of about 50,000 to 150,000.

As noted, it is presently preferred that the emulsion be a cationic emulsion, and it can contain a cationic emulsifier in an amount preferably less than about 3 percent by weight based on the weight of the oil phase. Generally, the weight of the cationic emulsifier will range between about 0.5 to about 3.0 percent by weight of the oil phase.

In addition to cationic emulsifiers, other surfactants and/or emulsifiers can be added, as well as mixtures thereof, to facilitate emulsification and to minimize foaming, if desired.

Emulsifiers can be of the class of fatty quaternary ammonium salts, fatty amido-amino-amine slats, e.g., amido-amino-amine acetate, etc., and include the use of both cationic and nonionic surfactants such as poly(ethoxy) compounds. Various suitable surfactants are described in standard textbooks, such as "Encyclopedia of Surface Active Agents" by Sisley and Wood (Chemical Publishing Company, Inc., New York) and "Surface Active Agents and Detergents" by Schwarz, Perry and Berch (Interscience Publishers, New York).

In addition to emulsifying agents, stabilizers also can be employed to stabilize the emulsion against electrolytes which may be present in the water employed to make or dilute the emulsion.

By a cationic emulsion is meant one in which the oil phase will deposit on the negative electrode if the emulsion is subjected to electrophoresis. Nonionic surfactants, as described, may be present in an amount up to as high as about 2 percent by weight of the oil phase.

The following examples illustrate the formation of stable emulsions for treating an asphalt-aggregate combination in accordance with the present invention.

EXAMPLE I

Emulsion Preparation

A series of emulsion systems were prepared as follows:

1. Oil phase preparation: An aromatic oil in the amount of 119 gallons was metered into a 150-gallon tank together with about 160 pounds of a butadiene-styrene rubber having an average molecular weight of about 122,000. Small quantities of Oronite NI-W, a water-soluble nonionic surfactant of the alkyl-phenolethylene oxide condensate type (available from Chevron Chemical Company), Cyanox SS (2,2'-methylene-bis(4-methyl-6-t-butyl phenol), and Automate Blue (1,4-dialkylaminoanthraquinone) used as a dye, were also added. The mixture was heated to 300° F. and stirred until all components were fully dissolved.

2. Water phase preparation: Water in the amount of 76.5 gallons was metered into a 375-gallon tank together with a small amount of Redicote E-1, a cationic emulsifier obtainable from Armour & Company. Contents of the tank were stirred and heated to about 170° F. Small amounts of Saponin, a surfactant available from S. B. Penick and Co., and 31.5% hydrogen chloride were then added to the water-phase tank.

3. Emulsion formation: The emulsions were formed by pumping the oil and water phases from their respective tanks through a Gifford-Wood homogenizing pump in series with a Charlotte colloid mill with clearance set at 0.004 inch operating against a minimum back pressure of 50 to 60 psig. The effluent product was chilled to about 100° F. and stored. The emulsions thus prepared had the following composition, in weight percentages, in terms of the two phases:

TABLE I

| Oil phase | Recipe No. (Wt. %) | |
|---|---|---|
| | 1 | 2 |
| Solprene GEO * | 18.0 | 18.0 |
| Oronite NI-W | 2.0 | 2.5 |

TABLE I-continued

| Oil phase | Recipe No. (Wt. %) | |
|---|---|---|
| | 1 | 2 |
| Automate Blue | 0.025 | 0.025 |
| Cyanox SS | 0.18 | 0.18 |
| $SO_2$ extract oil | 42.0 | 42.0 |
| Water phase | | |
| Redicote E-1 | 1.0 | 0.5 |
| 31.5% HCl | 0.45 | 0.45 |
| Methanol | 2.0 | 2.0 |
| Saponin | 0.06 | 0.06 |
| Water | To total | 100% |
| pH | 6–7 | 2–3 |
| Total | 100 | 100 |

* Butadiene-styrene block copolymer solution-polymerized having an average molecular weight of about 122,000.

Tests were made of the above emulsions as follows: microscopic examination at 100X for uniformity at a dilution of 1 part emulsion to 19 parts water; stability after 24-hour contact of 1 part emulsion with 4 parts of 10 percent by weight $CaCl_2$ solution; stability after 24-hour contact of 1 part emulsion with 4 parts of 5 percent by weight NaCl solution at ambient temperature; and storage at 140° F. to visible instability.

The results are tabulated below in Table II.

TABLE II

| Recipe No. | pH | Microscopic Examination at 100X | Stability after 24-Hour Test | | Storage at 140° F. to Visible Instability, Days |
|---|---|---|---|---|---|
| | | | $CaCl_2$ | NaCl | |
| 1 | 6–7 | Fair | Exc. | Exc. | 4 |
| 1 | 6–7 | Good | Exc. | Exc. | 1 |
| 2 | 2–3 | Fair | Exc. | Exc. | 9 |
| 2 | 2–3 | Exc. | Exc. | Exc. | 12 (still good when sample was accidentally lost) |
| 2 | 2–3 | Good | Good | Good | 7 |

The data show the improvement in high-temperature storage stability at the lower pH.

EXAMPLE II

A variable pH series of emulsions was made to determine effects of pH on storage life. pH was varied by the amount of HCl added to water phases. Both 2.5/0.5 and 2.0/1.0 Oronite NI-W/Redicote E-1 ratios by weight of emulsifier systems were used. This pH series ranged from a low of 1.9 to the standard 6.3 for water phases. Oil phase temperatures for emulsion makeup ranged between 225° and 240° F. Duplicate samples of different size were aged at 160° F. in a tray dryer to obtain accelerated aging data. Production and test data are given in Table III below.

TABLE III

| Oil phase | Wt. % |
|---|---|
| Solprene GEO | 18.0 |
| Oronite NI-W | Variable |
| Automate Blue | 0.025 |
| Cyanox SS | 0.18 |
| $SO_2$ extract oil | 42.0 |
| Water phase | |
| Redicote E-1 | Variable |
| 31.5% HCl | Variable |
| Methanol | 2.0 |
| Saponin | 0.06 |
| Water | To total 100% |
| Total | 100 |

Inspection and stability tests made of the emulsions as prepared in Table III are presented below in Table IV.

TABLE IV

Effect of Variable pH on Emulsion Properties

| Run No. | Oronite NI-W/ Redicote E-1/ 31.5% HCl Ratio by Wt. | Water Phase pH | Finished Emulsion pH | Microscopic Examination at 100X | 24-Hour Stability | | Days at 160°F[b] to Failure | |
|---|---|---|---|---|---|---|---|---|
| | | | | | $CaCl_2$ | NaCl | 4-oz. Bottle | 8-oz. Bottle |
| 1 | 2.5/0.5/0.45 | 1.9 | 2.5 | Good | Exc. | Exc. | 9 and Cont. | 28 and Cont. |
| 2 | 2.5/0.5/0.45 | 2.0 | 3.0 | Exc. | Exc. | Exc. | 5 | 44 and Cont. |
| 3 | 2.5/0.5/0.45 | 2.0 | 3.6 | Good | Fair | Good | 5 | 5 |
| 4 | 2.0/1.0/0.75 | 2.2 | 3.4 | Good | Good[a] | Exc. | 5 | 21–28 |
| 5 | 2.0/1.0/0.75 | 2.2 | 3.5 | Good | Good[a] | Exc. | 5 | 21–28 |
| 6 | 2.0/1.0/0.75 | 2.4 | 3.7 | Good | Poor[a] | Exc. | 6 | 6 |
| 7 | 2.0/1.0/0.75 | 2.4 | — | Exc. | Fail | Exc. | 5 | 5 |
| 8 | 2.5/0.5/0.35 | 3.5 | 6.3 | Fair | Poor | Poor | <2 hrs. | <2 hrs. |
| 9 | 2.5/0.5/0.35 | 4.3 | — | Fair | Fair | V.Good | 5 | 5 |
| 10 | 2.5/0.5/0.35 | 4.7 | 5.8 | Fair | Fair | Fair | <2 hrs. | <2 hrs. |
| 11 | 2.5/0.5/0.30 | 6.3 | 6.2 | Poor | Fail | Fail | <2 hrs. | <2 hrs. |

[a]Very little free oil phase but very severe stratification in 24 hours.
[b]The tests were the same as those used in Example I, except that more severe storage temperature (160° F.) was used.

As shown by the data in Table IV, emulsion pH has a pronounced effect on both emulsion stability and high-temperature storage characteristics. (Storage at 160° F. is somewhat more severe than 140° F. storage, and data from this series cannot accurately be compared to other storage data obtained at 140° F.) The reason for better 160° F. storage stability for the 8-ounce samples over the 4-ounce samples for several emulsions is unknown. Variable pH data shown for constant emulsifier component charges result from slight variability of both Redicote and HCl interaction.

Low emulsion pH was shown to be necessary for good emulsion formation and high-temperature storage stability. The best emulsion was prepared with a water phase pH of 2.0 (Run 2). This emulsion rated excellent by tests on the freshly made emulsion and was still stable at 160° F. when the test was terminated at 44 days. Emulsions prepared at water phase pH levels above 2.2 gave poor high-temperature storage results; with 3.5 pH levels and above, initial properties had dropped to only fair makeup at best. The standard recipe with 6.3 water phase pH (Run 11) gave the poorest results of all.

EXAMPLE III

As a further check on the effect of pH on high-temperature storage stability, samples of Run 11, Table IV, were treated with 31.5% HCl to variable pH and aged at 140° F. in pint bottles. Samples prepared are listed in Table V showing aging results.

TABLE V

140° F. Stability of Variable pH of Run 11 (Table IV) Emulsion Samples

| Sample pH | Hours Aged at 140°F to Visible Instability |
|---|---|
| (Untreated) 6.3 | 2 |
| 5 | 17 |
| 4 | 17 |
| 3 | 336 (14 days) |
| 2 | 336+ |
| 1 | 336+ |

The data indicate improved high-temperature storage stability for low pH emulsion. Since emulsions at pH 1, 2 and 3 appear to be equally stable, it is only necessary to maintain a pH of 3 or less to improve stability. This can be done either by adjusting the recipe or by the careful addition of 31.5% HCl either to the water phase of the emulsion before combining the oil phase therewith or to a finished emulsion of higher pH to bring the pH to the desired level.

Reasonable variations and modifications can be made or followed in the foregoing specification without departing from the spirit and scope thereof.

What is claimed is:

1. A friction- and storage-stable oil-in-water emulsion concentrate having a pH in the range of 1 to 3.5 and having an oil phase and a water phase and wherein said water phase constitutes from about 25 to 60 weight percent of the total emulsion, wherein said oil phase contains from 2 to 40 weight percent elastomer taken from the group consisting of natural rubber, butadiene styrene copolymers, SBR block copolymers, cis-polyisoprene and trans-polyisoprene dissolved therein, wherein said oil phase is formed of an aromatic oil having an aromatic content of at least 50 percent and a viscosity below about 50 SUS at 210° F. and wherein said emulsion contains a cationic or nonionic emulsifier.

2. An emulsion concentrate according to claim 1 wherein said elastomer is a styrene-butadiene block copolymer.

3. An emulsion concentrate according to claim 1 wherein said oil phase contains 18 weight percent elastomer dissolved therein.

4. An emulsion concentrate according to claim 1 wherein said oil phase contains 12 weight percent elastomer dissolved therein.

5. An emulsion concentrate according to claim 2 wherein said styrene-butadiene block copolymer has an average molecular weight in the range of 50,000 to 150,000.

6. An emulsion concentrate according to claim 1 wherein said emulsifier is a cationic emulsifier and wherein said emulsifier is present in an amount in the range of between about 0.5 to about 3.0 percent by weight of the oil phase.

* * * * *